(12) United States Patent
Mo et al.

(10) Patent No.: US 11,347,693 B2
(45) Date of Patent: *May 31, 2022

(54) MANAGEMENT OF COLLABORATIVE TEAMS

(71) Applicant: Intel Corporation, Santa Clara, CA (US)

(72) Inventors: Stanley Mo, Portland, OR (US);
Robert Staudinger, Salzburg (AT);
Rita H Wouhaybi, Portland, OR (US);
Mubashir A Mian, Morton Grove, IL (US); Tobias Kohlenberg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 529 days.

This patent is subject to a terminal disclaimer.

(21) Appl. No.: 16/370,348

(22) Filed: Mar. 29, 2019

(65) Prior Publication Data

US 2019/0362313 A1 Nov. 28, 2019

Related U.S. Application Data

(63) Continuation of application No. 15/383,208, filed on Dec. 19, 2016, now Pat. No. 10,296,871, which is a
(Continued)

(51) Int. Cl.
*G06F 16/176* (2019.01)
*G06F 16/93* (2019.01)

(52) U.S. Cl.
CPC ............ *G06F 16/176* (2019.01); *G06F 16/93* (2019.01)

(58) Field of Classification Search
CPC .............................. G06F 16/93; G06F 16/176
See application file for complete search history.

(56) References Cited

U.S. PATENT DOCUMENTS

| 6,212,534 B1 | 4/2001 | Lo et al. |
| 6,240,414 B1 | 5/2001 | Beizer et al. |
(Continued)

FOREIGN PATENT DOCUMENTS

| JP | 2002024501 | 1/2002 |
| TW | 200841190 | 10/2008 |
(Continued)

OTHER PUBLICATIONS

Communication pursuant to Rules 70(2) and 70a(2) EPC for European Patent Application No. 17177816.0, dated Dec. 4, 2017.
(Continued)

*Primary Examiner* — Usmaan Saeed
*Assistant Examiner* — Jessica N Le
(74) *Attorney, Agent, or Firm* — Essential Patents Group, LLP.; Christopher K. Gagne

(57) ABSTRACT

Systems and methods for dynamically creating collaborative teams and managing collaborative work of a team are generally disclosed herein. One example embodiment includes the dynamic creation of a collaborative team by creating an association between team members via a managing module. The managing module may be capable of managing, among other things, team members on a team, tasks and goals of each member of the team, as well as documentation associated with the team. In some embodiments, the managing module may use a chat or messaging protocol to manage collaborative modifications to documents of the team.

25 Claims, 5 Drawing Sheets

Related U.S. Application Data continuation of application No. 13/992,823, filed as application No. PCT/US2011/067943 on Dec. 29, 2011, now Pat. No. 9,524,297.

(56) References Cited

U.S. PATENT DOCUMENTS

| | | | |
|---|---|---|---|
| 6,629,129 | B1 | 9/2003 | Bookspan et al. |
| 7,111,230 | B2 | 9/2006 | Euchner et al. |
| 7,155,435 | B1 | 12/2006 | Day et al. |
| 7,818,678 | B2 | 10/2010 | Massand |
| 8,453,052 | B1 | 5/2013 | Newman et al. |
| 9,524,297 | B2 | 12/2016 | Mo et al. |
| 2002/0052862 | A1 | 5/2002 | Scott |
| 2002/0065848 | A1 | 5/2002 | Walker |
| 2004/0174392 | A1 | 9/2004 | Bjoernsen et al. |
| 2005/0027696 | A1 | 2/2005 | Swaminathan et al. |
| 2005/0080859 | A1 | 4/2005 | Lake |
| 2005/0086384 | A1 | 5/2005 | Ernst |
| 2005/0262075 | A1 | 11/2005 | Beartusk |
| 2006/0031772 | A1 | 2/2006 | Valeski |
| 2006/0053194 | A1 | 3/2006 | Schneider et al. |
| 2006/0064434 | A1 | 3/2006 | Gilbert et al. |
| 2007/0118598 | A1 | 5/2007 | Bedi et al. |
| 2007/0143663 | A1 | 6/2007 | Hansen et al. |
| 2007/0226604 | A1 | 9/2007 | Chalasani et al. |
| 2009/0125518 | A1 | 5/2009 | Bailor et al. |
| 2009/0192845 | A1* | 7/2009 | Gudipaty ............ G06F 3/04842 705/7.19 |
| 2009/0271696 | A1* | 10/2009 | Bailor .................. G06F 16/954 715/229 |
| 2010/0241711 | A1* | 9/2010 | Ansari .................... H04L 67/20 709/205 |
| 2011/0016409 | A1 | 1/2011 | Grosz et al. |
| 2012/0089569 | A1* | 4/2012 | Mason, Jr. .......... G06F 16/1873 707/639 |
| 2014/0089308 | A1* | 3/2014 | Ramakrishnan ........ G06F 16/93 707/736 |
| 2014/0280129 | A1* | 9/2014 | Howarth ................. G06F 21/62 707/736 |
| 2015/0378997 | A1* | 12/2015 | Becker .................. H04L 65/403 707/748 |

FOREIGN PATENT DOCUMENTS

| | | |
|---|---|---|
| TW | 200921421 | 5/2009 |
| WO | 2013101113 | 7/2013 |

OTHER PUBLICATIONS

Extended European Search Report, and related attachments, for European Patent Application No. 11878412.3, dated May 13, 2015.
Extended European Search Report, and related attachments, for European Patent Application No. 17177816.0, dated Aug. 14, 2017.
Google Docs, Sheets and Slides, Wikipedia article, https://en.wikipedia.org/wiki/Google_Docs_Sheets_and_Slides, retrieved Jun. 15, 2017.
IBM Connections, Wikipedia article, https://en.wikipedia.org/wiki/IBM_Connections, retrieved Jun. 15, 2017.
IBM Docs, First Edition, IBM Corporation, 2012.
IBM Lotus Connections 2.5 develops professional communities and networks of colleagues, IBM United States Announcement 209-210, IBM Corporation, Aug. 18, 2009.
IBM Lotus Connections delivers social software for businesses, IBM United States Announcement 207-112, IBM Corporation, May 15, 2007.
International Preliminary Report on Patentability for PCT Application No. PCT/US2011/067943, dated Jul. 10, 2014.
International Search Report and Written Opinion for PCT Application No. PCT/US2011/067943, dated Aug. 30, 2012.
Notice of Allowance for Taiwanese Patent Application No. 101148330, dated Mar. 30, 2018.
Notice of Allowance for U.S. Appl. No. 15/383,208, dated Jan. 3, 2019.
Notice of Allowance, and related attachments, for U.S. Appl. No. 13/992,823, dated Aug. 11, 2016.
Office Action (and related search report) for European Patent Application No. 11878412.3 dated Feb. 28, 2017.
Office Action (and related search report), and summarized partial English translation for Taiwanese Patent Application No. 101148330, dated Mar. 24, 2017.
Office Action (and related search report), and summarized partial English translation for Taiwanese Patent Application No. 101148330, dated Nov. 4, 2014.
Office Action, and related attachments, for European Patent Application No. 171177816.0, dated Feb. 4, 2019.
Office Action, and related attachments, for U.S. Appl. No. 13/992,823, dated May 6, 2015.
Office Action, and related attachments, for U.S. Appl. No. 15/383,208, dated Apr. 10, 2017.
Office Action, and related attachments, for U.S. Appl. No. 15/383,208, dated Dec. 8, 2017.
Office Action, and related attachments, for U.S. Appl. No. 15/383,208, dated Jun. 7, 2018.
Office Action, and related attachments, for U.S. Appl. No. 15/383,208, dated Mar. 21, 2018.
Office Action, and related attachments, for U.S. Appl. No. 15/383,208, dated Oct. 4, 2017.
Office Action, and related attachments, for U.S. Appl. No. 13/992,823, dated Aug. 28, 2015.
Office Action, and related attachments, for U.S. Appl. No. 13/992,823, dated Mar. 24, 2016.
Office Action, related attachments, and summarized partial English translation for Taiwanese Patent Application No. 101148330, dated Jul. 22, 2015.
Office Action, related attachments, and partial English summarized translation, for Taiwanese Patent Application No. 101148330, dated Nov. 10, 2017.
Summons to attend oral proceedings dated Jan. 25, 2018 in European Patent Application No. 11878412.3, and related attachments.

* cited by examiner

07/11/2011 1:13:13pm TM$_1$  File created

07/11/2011 1:14:52pm TM$_1$  Add line 1 "The quick brown fox"

07/12/2011 1:20:22pm TM$_3$  Add line 2 "The quick brown fox"

07/12/2011 1:25:37pm TM$_4$  Replace line 2 with "The slow green frog" (source file 234.21.document)

07/12/2011 1:31:22pm TM$_2$  Delete line 6

07/13/2011 8:13:07am TM$_5$  Add image after line 9 "Figure 2" (source file 681.83.jpg)

*FIG. 4*

MANAGEMENT OF COLLABORATIVE TEAMS

TECHNICAL FIELD

Embodiments pertain to network-based communications. Some embodiments relate to the use of chat or messaging protocols to create network-based connections.

BACKGROUND

An employee or worker may have a broad, multifaceted role in a business or corporation. The worker may belong to several different collaborative teams and may be one of any number of members on the team. In some cases, these teams may have overlapping membership and goals. Additionally, each team may have multiple shared documents upon which the team may collaborate.

Collaborative teams may create a logistical challenge for each worker on the team. For example, it may be difficult for a worker to keep track of the various teams of which the worker may be a member, including keeping track of the worker's role, other team members, deliverables, etc. Additionally, it may be difficult to ensure that each worker is working from the most up-to-date content or document and is able to find any relevant resources needed.

Typically, collaborative work may be managed via technologies that use local and cloud-based services to try to address user needs. Current technologies may create a patchwork of ad-hoc Internet sites and applications which provide marginal productivity gains. Furthermore, because these current technologies are typically proprietary, it may be difficult to create a common ground for various applications from different vendors to allow these applications to work together in a useful way.

BRIEF DESCRIPTION OF THE DRAWINGS

FIG. 4 illustrates an example data file containing information about modifications made to a collaborative document in accordance with example embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Several of the embodiments described herein provide techniques for creating and managing collaborative working teams using a team management module or a team management logic unit. In example embodiments, a collaborative team may be created by creating an association between team members and the collaborative documents belonging to the collaborative team. In some embodiments, a team member on a particular team may also be a member of any number of other teams. The associations between teams and team members may be mapped and used for efficient project management. In some embodiments, the collaborative team may be created upon the creation of an initial meeting of the team. For example, a team leader may send a meeting invitation to members of the team to begin work on a team project associated with the team. The association between team members may be created via the creation of the meeting invitation sent to members of the team.

In some embodiments, each team may be associated with one or more collaborative team documents related to a team project. These documents may be created using any software application, herein referred to simply as "application." for the creation of any kind of document, such as, e.g., a spreadsheet document, a word processing document, a presentation document, etc. Each document that is related to the team project may be associated with the members of the team. In some embodiments, the team management module may allow members of the team to simultaneously modify a collaborative team document in a manner such that each member of the team is notified of changes made by other team members and provided an up-to-date version of the document.

In some embodiments, the team management module may utilize an infrastructure that is based on a chat or messaging protocol. This infrastructure may allow for the organization and management of links between team members and documents, as well as simultaneous modifications made to a document by one or more team members.

Figure 1:
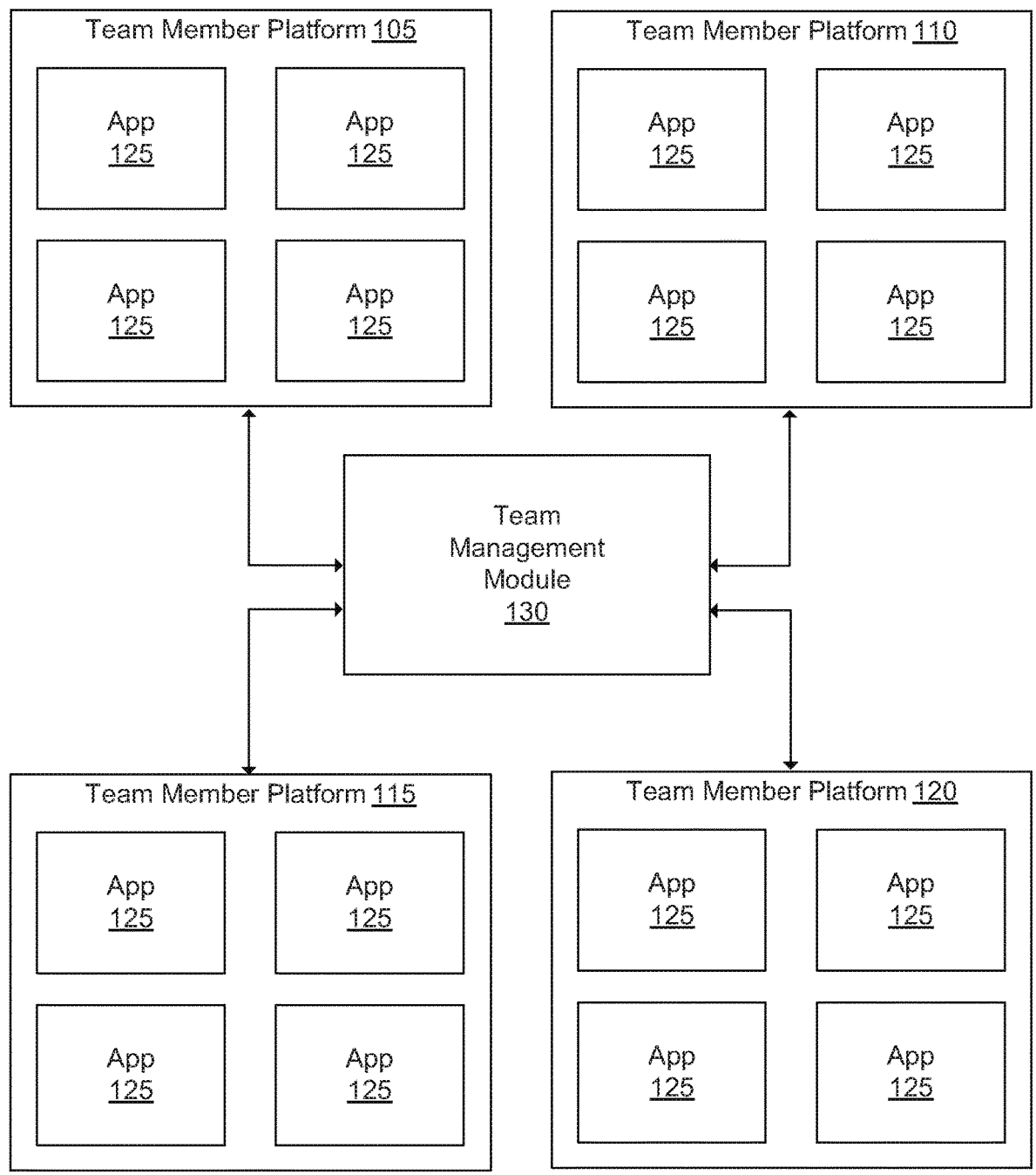
FIG. 1 illustrates an exemplary collaborative team environment in accordance with example embodiments.

For example, FIG. 1 depicts an exemplary collaborative team environment 100 through which the creation and management of a team and its documents may be performed. The collaborative team environment may include a team management module 130 in communication with one or more team member platforms (105, 110, 115, and 120) having one or more applications 125. The collaborative team environment may be in communication with the one or more team member platforms (105, 110, 115, and 120) via any type of communication network.

The one or more applications 125 of each team member platform 105, 110, 115, and 120 may be any application that a team member may use to perform any task. For example, these applications 125 may include a spreadsheet application, a word processing application, a presentation application, a calendar or meeting application, an Internet browser, an email application, a chat application, etc. Each team member platform 105, 110, 115, and 120 may include any number and type of application 125. In some embodiments, the applications 125 may be in communication with one another such that activity by a team member within one application may impact activity within another application.

The team member platforms 105, 110, 115, and 120 in communication with the team management module 130 may represent platforms of a member or worker on a collaborative team. In some embodiments, these team member platforms 105, 110, 115, and 120 may be a machine (e.g., computer) having applications through which a team member may work on any team project. For example, the team member platforms 105, 110, 115, and 120 may be workstations on which a user may create and/or modify a collaborative team document using an application 125. The collaborative team environment 100 may have any number of team member platforms 105, 110, 115, and 120. For example, a team having four team members may include four team member platforms, which the team management module 130 may associate with one another and manage. Additionally, the team management module 130 may manage any number of teams having any number of team member platforms associated with each team.

In some embodiments, the team management module 130 may be implemented in any manner (e.g., hypertext markup language (HTML)). In one embodiment, the team management module 130 may be implemented using HTML5, such that the team management module 130 may be platform independent and may operate via any operating system. The team management module 130 may use a chat or messaging protocol to create collaborative connections between each team member (and team member platforms) as well as between applications 125 of each team member platform, allowing these entities to communicate information such as, e.g., each entity's state, changes to documents made by team members, requests or transactions for harmonizing interactions, etc. The chat or messaging protocol may be any chat or messaging protocol (e.g., extensible messaging and presence protocol (XMPP)). The chat protocol allows the team management module 130 to monitor and manage connections as well as creation and modification of team documents. In some embodiments, the chat protocol allows for the creation of a data file containing information, such as information about modifications made to a document by team members, when each modification was made and by whom, sources of the content in the document, etc. Because the data file created via the chat protocol concisely describes modifications to a document, the updating of team member documents may be efficient. Furthermore, using the chat infrastructure may allow platform-agnostic team collaboration.

In some embodiments, the applications 125 may be part of a suite of applications that include the team management module 130. In some embodiments, the team management module 130 may be a third-party application capable of managing documents via an application programming interface (API) or a plug-in or add-on for applications 125, such as applications in Microsoft Office™, which was developed by Microsoft™, Inc. of Redmond, Wash.

In some embodiments, a collaborative working team may be dynamically defined via a calendar entry made using a calendar application, which may be one of the applications 125. This may be useful since calendar applications may contain contact information for people within an organization and may be used to schedule meetings with other people. For example, a team may meet regularly at a particular time and date with a set of team members attending the meetings. These meetings may be defined by a calendar entry for this meeting, with each of the team members being dynamically associated with the calendar entry and thus dynamically defining the team for a particular project related to the meetings. In some embodiments, the team may have a hierarchy of team members being defined by the calendar entry (e.g., team leader, section leaders, etc.). The team members of the team (or a subset of the hierarchy or members of the team) may be linked via a common chat server list which allows these team members to share a virtual network with one another used for communications, collaborations, document state sharing, etc.

In some embodiments, documents associated with a team may be opened by one or more team members during a team meeting, such as a team meeting specified by a calendar entry of each team member. These documents may be documents distributed to the team prior to the team meeting. During the team meeting, the chat infrastructure of the team management module 130 may examine the team members attending the meeting as well as documents opened by the team members during the meeting on the team member platforms. Common documents opened on team members' platforms may be identified automatically and associated with the team and the team members. In some embodiments, the team management module 130 may determine that a particular document is used more frequently by a particular subset of the plurality of team members and may define that subset of team members as a core group of team members to the team.

In some embodiments, these common documents may be identified by the team members themselves and tagged as being associated with the team, either before or after distribution of the document. In some embodiments, documents common to the team may be stored in a designated location. In some embodiments, these identified files and/or folders may be highlighted by team members as being associated with the team. The metadata for these files and/or folders may be associated with one or more calendar entries associated with the team, and the files and/or folders themselves may be tagged as being associated with the one or more calendar entries as well. For example, a document may include a metadata tag indicating calendar information, project title, team members, optional attendees for a meeting, etc.

In some embodiments, the metadata for documents common to the team may be used to search for similar content and information on the collaborative team environment 100 (e.g., content from other projects). For example, a search for similar existing content from one project may result in material that may be used to advance the progress of another project. Additionally, in some embodiments, each document may have weighed values associated with the metadata tag of the document. These weighed values may be based on frequency of use, particular individual sections of the document used most frequently, age of the document, etc. These weighed values may be used to determine the importance and/or relevance of the document.

Figure 2:
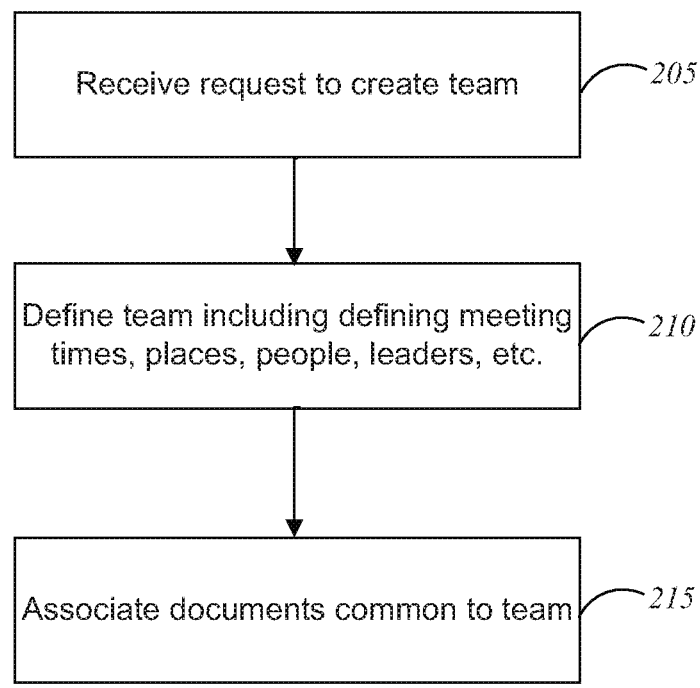
FIG. 2 illustrates an exemplary method for creating a collaborative team association in accordance with example embodiments.

FIG. 2 illustrates an exemplary method 200 for creating a collaborative team association. In operation 205, the team management module 130 may receive a request to create a team. The request may include information such as team members of the team, documents associated with the team, etc. In some embodiments, the request may be sent via a calendar entry using a calendar application, as described above. In some embodiments, a request may be generated by a team member of the team.

In operation 210, the team management module may use the information in the request to define the team. The team may be defined by information such as scheduled meeting times and places, team members, leaders, project title, business departments associated with the project, etc.

In operation 215, the team management module may also use the information in the request to associate the appropriate documents with the team defined in operation 210. In some embodiments, the association of these documents may be stored in memory at the team management module. In some embodiments, team members may be able to access this information to change associations of documents to a team or to add additional documents to be associated.

Figure 3:
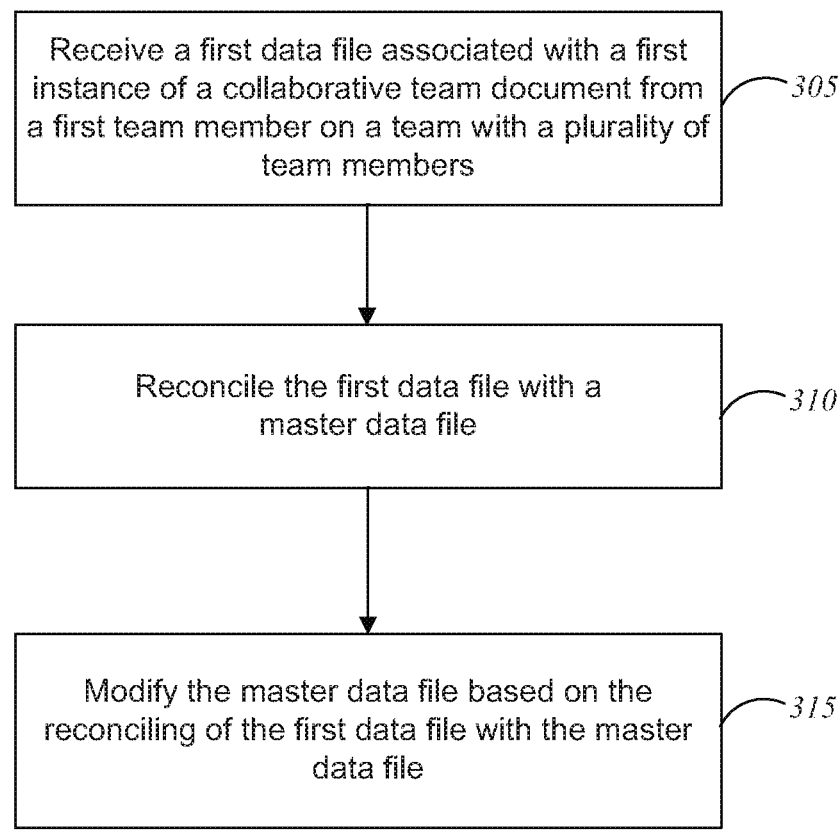
FIG. 3 illustrates an exemplary method for providing collaborative documentation to a plurality of team members on a team in accordance with example embodiments.

FIG. 3 illustrates an exemplary method 300 for providing collaborative documentation to a plurality of team members on a team. A team may work from a document collaboratively, and team members may be able to simultaneously contribute to the document, whether the team members are online or offline. Each team member may have a working copy of the collaborative document on the team member's platform, such as team member platforms 105, 110, 115, and 120. The team members may each have a working copy through applications on their platforms (such as application 125), which may be in communication with one another through the chat infrastructure. When a team member opens his or her copy of the collaborative document via an application on the team member's platform, the team member may modify the document, whether online or offline. The modifications made to the document may include additions, deletions, changes to content, etc. In some embodiments, the modification may include an addition of content from other document sources.

When a team member modifies a working copy, a data file may be modified accordingly. The data file may be associated with the working copy on the team member's platform and may contain a list of modifications made to a document since the document was initially created. The data file may include information about modifications made to the document, including any modifications made by team members, sources for content modified (e.g., other documents on the system), etc. In some embodiments, the data file having modification information may resemble a chat file indicating a date, time, an identifier for one or more users, and the chat content from each user.

In some embodiments, the data files may be synchronized using a master clock. This may ensure that the times when modifications were made to copies of a collaborative document are synchronized across team member platforms. In some embodiments, a particular team member platform (e.g., a team leader) may serve as the master platform, and the clock of that platform may be used as the master clock.

When team members' copies of a collaborative document are to be merged, in operation 305 of FIG. 3, the team management module 130 may receive data files associated with copies or instances of a collaborative team document from a plurality of team member's platforms. This may include receiving from a first team member platform of a first team member a first data file associated with a first instance of the collaborative team document. The first data file may be a data file for a first instance that is a copy of a collaborative team document and is stored on the first team member's platform. The first data file may include information about modifications made to the first document.

In operation 310, the team management module 130 may reconcile the first data file with a master data file. The master data file may include information about modifications made to the collaborative team document by at least a portion of the plurality of team members. The reconciling may include merging and assembling the first data file (and any other data files received from other team members) into the master data file associated with the collaborative team document. In some embodiments, a team member (e.g., a team leader, leader for a particular document section, etc.) may store the master data file on his or her team member platform. In some embodiments, the data files from the plurality of team members may be reconciled to the master data file according to the master clock. That is, modifications made to copies of the collaborative document may be used in the master data file according to relative chronological order. In some embodiments, the modifications may be used in the master data file according to certain preferences, such as priority of team members submitting the modifications, for example. In some embodiments, conflicts between modifications made amongst team members may be highlighted and resolved at a later time. For example, the highlighted conflicts may be resolved by a particular team member or by the team as a whole during a subsequent review of the conflicts.

Once the master data file is reconciled and updated accordingly, the collaborative team document may be updated accordingly using the updated master data file. In some embodiments, the master data file may be pushed to team member platforms. In some embodiments, the master data file may be pulled by the team member platforms. In some embodiments, the updating of local copies of the collaborative team document may occur automatically. Since the master data file contains raw data of changes made to the collaborative team document, updating the collaborative team document may be done quickly.

In operation 315, the team management module 130 may modify the master data file based on the reconciling of the first data file with the master data file. The master data file may then be used to update instances of the collaborative team document of the plurality of team members. This may be done by sending a copy of the master data file containing the updated modification information to each of the team member platforms associated with the team. The team member platforms may update their data file using the master data file, which may allow the copy of the collaborative team document stored on the platform to be updated accordingly. In some embodiments, this may occur automatically. This allows the copy of the collaborative team document to be modified based on the changes made, without having to download another copy of the entire collaborative team document.

In some embodiments, authentication and additional security features may be integrated with each team member platform so that documents may reside encrypted on the platform. The additional security may include restricting access to documents to particular team members having an encryption key for the document, automatically closing a document after a period of inactivity, limiting access to a document based on the team platform or user device used to access the document, etc.

In some embodiments, the updating of the data files may occur in or near real-time. That is, each time a team member modifies a document, the data file for that document may be sent to the team management module 130 and may be used to update the master data file, as well as other team member's data files. In some embodiments, the real-time modifications and updates to the collaborative document may be made during a meeting of the team. Furthermore, because the team management module 130 operates using a chat infrastructure, in an embodiment, team members may chat with one another via the team member platforms for further collaboration.

In some embodiments, a team leader may be in charge of a team project and may be the responsible party for reconciling modification conflicts. In some embodiments, this responsibility may be passed between members of the team. In some embodiments, a subset of team members may be restricted from certain modification authority. For example, some team members may be restricted from submitting a modification which conflicts with another team member's modifications.

FIG. 4 illustrates an example data file 400 containing information about modifications made to a collaborative document. The data file 400 may include a date 405 and a time 410 that a modification was made to a document. The data file may also include identifiers 415 identifying the team member who made the modification. The data file may include additional information such as when the document was created 420 and the contents of the modification 425. The data file may also include information about the source of the contents 430. The modification information may be used to update a document accordingly.

In some embodiments, the data files may be used to generate statistical information about a team member. For example, the data files may be used to track how much a particular team member has contributed to a document by tracking the modifications the team member has made, how long a team member has worked on a document, whether the contributions were original or were derived from other sources on the system, etc.

Figure 5:
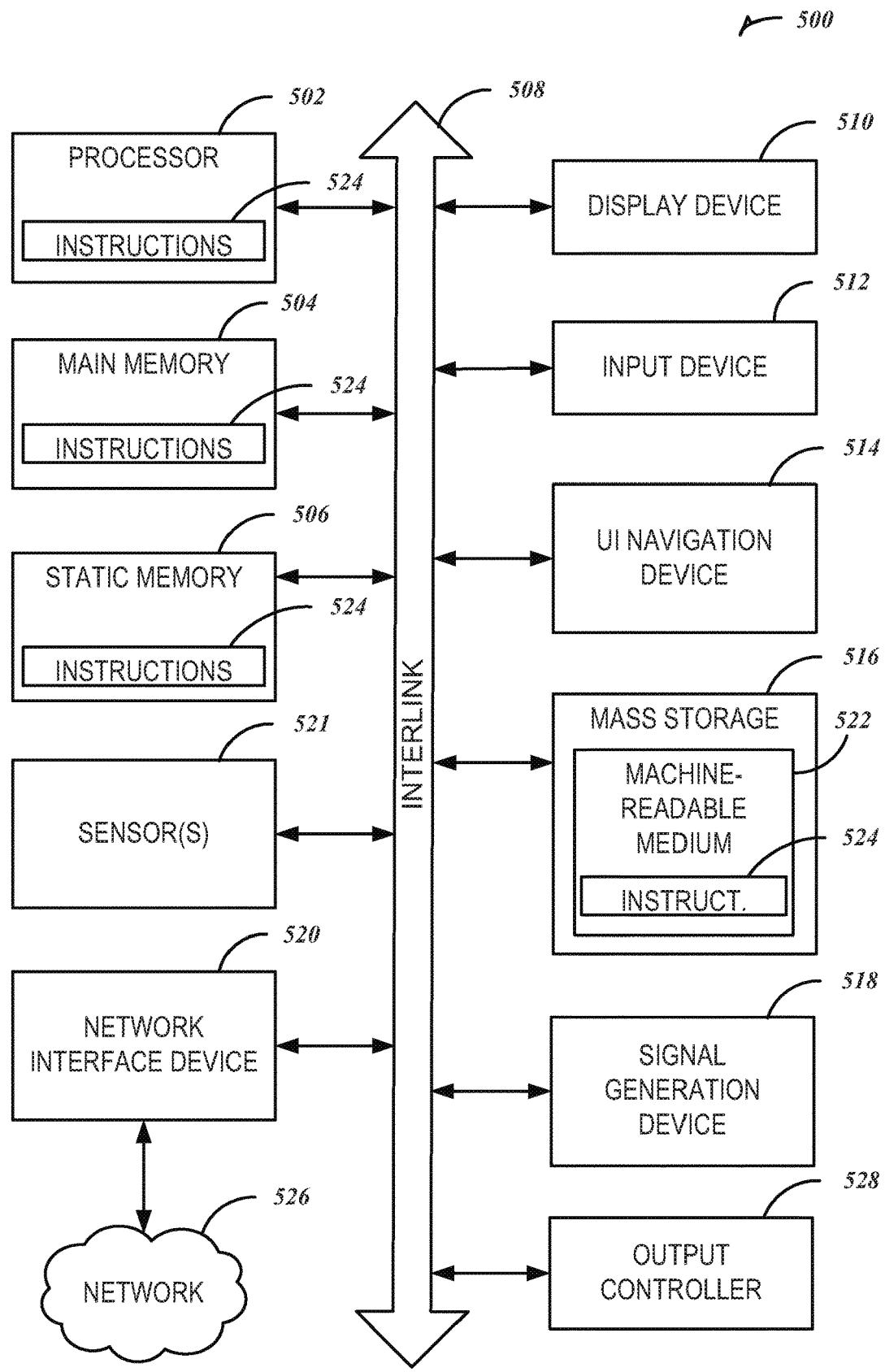
FIG. 5 illustrates a block diagram of an example machine upon which any one or more of the techniques discussed herein may be performed in accordance with example embodiments.

FIG. 5 illustrates a block diagram of an example machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 500 may include a hardware processor 502 (e.g., a central processing unit (CPU), a graphics processing unit (GPU), a hardware processor core, or any combination thereof), a main memory 504, and a static memory 506, some or all of which may communicate with each other via an interlink 508 (e.g., a bus). The machine 500 may further include a display device 510, an input device 512 (e.g., a keyboard), and a user interface (UI) navigation device 511 (e.g., a mouse). In an example, the display device 510, input device 512, and UI navigation device 514 may be a touch screen display. The machine 500 may additionally include a mass storage (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The mass storage 516 may include a machine-readable storage medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage 516 may constitute machine readable media.

While the machine-readable storage medium 522 is illustrated as a single medium, the term "machine readable medium" may include a single medium or multiple media (e.g., a centralized or distributed database, and/or associated caches and servers) that configured to store the one or more instructions 524.

The term "machine-readable storage medium" may include any tangible medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES AND EXAMPLES

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

Example 1 describes an apparatus, system, method, or machine readable medium for managing a collaborative working environment having a plurality of team members. The system and apparatus may include one or more processors in communication with a team management logic unit or a managing module and may be configured to manage the collaborative working environment. A first data file associated with a first instance of the collaborative team document having been edited by the first team member may be received by the managing module or team management logic unit. The first data file may include information about modifications made to the first instance of the collaborative document. The first data file may be reconciled with a master data file. The master data file may include information about modifications made to the collaborative team document by at least a portion of the plurality of team members. The master data file may be modified based on the reconciling of the first data file with the master data file. The master data file may be used to update instances of the collaborative team document of the plurality of team members. The system may also include one or more processors, one or more applications in communication with the one or more processors, wherein the one or more applications is capable of creating the collaborative document, and the managing module in communication with the one or more processors.

In Example 2, the apparatus, system, method, or computer-readable medium of Example 1 may be optionally performed or configured such that the master data file includes data for tracking modifications made to the collaborative team document based on a chat protocol.

In Example 3, the apparatus, system, method, or computer-readable medium of the Examples 1-2 may be optionally performed or configured such that each team member of the plurality of team members is automatically associated with one another based on a meeting request identifying the plurality of team members.

In Example 4, the apparatus, system, method, or computer-readable medium of the Examples 1-3 may be optionally performed or configured such that each team member of the plurality of team members is associated with one another based on a team member request to associate the plurality of team members with one another.

In Example 5, the apparatus, system, method, or computer-readable medium of the Examples 1-4 may be optionally performed or configured such that a team member of the plurality of team members may be automatically removed from the plurality of team members based on a frequency of activity of the team member.

In Example 6, the apparatus, system, method, or computer-readable medium of the Examples 1-5 may be optionally performed or configured such that a request to remove a team member of the plurality of team members is received and the team member is removed from the plurality of team members in response to the request.

In Example 7, the apparatus, system, method, or computer-readable medium of the Examples 1-6 may be optionally performed or configured such that the team management logic unit, one or more processors, or managing module is remote from team member platforms of the plurality of team members.

In Example 8, the apparatus, system, method, or computer-readable medium of the Examples 1-7 may be optionally performed or configured such that the team management logic unit, one or more processors, or managing module resides on a team member platform of a team member of the plurality of team members.

In Example 9, the apparatus, system, method, or computer-readable medium of the Examples 1-8 may be optionally performed or configured such that the reconciling of the first data file with the master data file includes reconciling conflicts between modifications made by the first team member and modifications made by a second team member.

In Example 10, the apparatus, system, method, or computer-readable medium of the Examples 1-9 may be optionally performed or configured such that the reconciling of the conflicts is based on a time of the modifications made by the first team member and a time of the modifications made by the second team member.

In Example 11, the apparatus, system, method, or computer-readable medium of the Examples 1-10 may be optionally performed or configured such that the information about the modifications made to the collaborative team document includes any one or combination of: one or more sources of content in the collaborative team document, an identity of a team member associated with one or more modifications, or a time associated with one or more modifications.

In Example 12, the apparatus, system, method, or computer-readable medium of the Examples 1-11 may be optionally performed or configured such that a second data file associated with a second instance of the collaborative team document having been edited by a second team member is received, the second data file including information about modifications made to the second instance of the collaborative team document. The managing module may determine a priority of a first modification indicated in the first data file and a priority of a second modification indicated in the second data file, wherein the modifying of the master data file is based on the determined priorities.

In Example 13, the apparatus, system, method, or computer-readable medium of the Examples 1-12 may be optionally performed or configured such that the determined priorities may be based on any one or combination of a hierarchy of the plurality of team members or a time of the first modification and a time of the second modification.

In Example 14, the apparatus, system, method, or computer-readable medium of the Examples 1-13 may be optionally performed or configured such that statistical information associated with the first team member is generated using the first data file, the statistical information being related to contributions of the first team member to the collaborative team document.

In Example 15, the apparatus, system, method, or computer-readable medium of the Examples 1-14 may be optionally performed or configured such that the collaborative team document is one of a spreadsheet document, a presentation document, or a word processing document.

In Example 16, the apparatus, system, method, or computer-readable medium of the Examples 1-15 may be optionally performed or configured such that the master data file is used to update instances of the collaborative team document automatically.

What is claimed is:

1. One or more non-transitory machine-readable media storing instructions that are capable of being executed by one or more servers, the one or more servers being capable of communicating, when the one or more servers are in operation, via one or more networks with remote computer platforms, the instructions when executed by the one or more servers resulting in the one or more servers being capable of performing operations comprising:
   providing document-related information that is to be communicated via the one or more networks, the information being for use by the remote computer platforms, the information being usable to modify one or more documents to reflect online collaborative editing to be carried out using the computer platforms, the information being based upon user editing requests received via the remote computer platforms during the collaborative editing, the one or more documents to be associated with one or more groups of users for permitting the collaborative editing, the one or more documents to be created using one or more software applications to be executed by one or more of the remote computer platforms, the one or more documents to be stored at the one or more servers, the information also to be used to indicate (1) respective document modifications requested by respective users in the one or more groups during the online collaborative editing, and (2) the respective users requesting the respective document modifications; and
   providing user chat message information that is to be communicated via the one or more networks, during the online collaborative editing;
   wherein:
      the one or more servers are capable of associating, based upon user input, the one or more documents with (1) the one or more groups and (2) one or more project names of one or more projects associated with the one or more groups;
      the one or more documents are capable of being tagged with user-selected metadata tag information, to indicate association of the one or more documents with the one or more project names;
      the user-selected metadata tag information is also to enable searching based upon the one or more project names;
      one or more notifications are to be provided to the one or more users to indicate creation of the one or more projects;
      one or more other documents stored by the one or more of the computer platforms are to be automatically identified for sharing among the users of the one or more groups;
      automatic identification of the one or more other documents for the sharing among the users of the one or more groups is to be determined based at least in part upon whether the one or more other documents are stored in one or more locations.

2. The one or more non-transitory machine-readable media of claim 1, wherein:
   the user editing requests are to be generated during the online collaborative editing; and
   during the online collaborative editing, the one or more documents are to be modified based upon the document-related information, in or near real-time to reflect the user editing requests.

3. The one or more non-transitory machine-readable media of claim 2, wherein:
    the one or more software applications are to be stored at the one or more of the computer platforms;
    the one or more servers are to receive one or more requests associated with one or more of the users of the one or more groups, the one or more documents to be associated with the one or more groups based upon the one or more requests associated with the one or more of the users of the one or more groups.

4. The one or more non-transitory machine-readable media of claim 3, wherein:
    one or more subsets of the users of the one or more groups are to be restricted from modifying the one or more documents; and
    the document-related information comprises tracking-related information to track:
        one or more times and one or more dates of one or more document changes.

5. The one or more non-transitory machine-readable media of claim 4, wherein:
    one or more other notifications are to be provided to indicate the one or more document changes;
    the one or more software applications comprise:
        a spreadsheet application;
        a word processing application; and/or
        a presentation application; and
    the one or more documents comprise a word processing document, a spreadsheet document, and/or a presentation document.

6. The one or more non-transitory machine-readable media of claim 5, wherein:
    the metadata tag information is also to enable search for content similarities.

7. The one or more non-transitory machine-readable media of claim 6, wherein:
    the one or more documents are to be encrypted.

8. The one or more non-transitory machine-readable media of claim 7, wherein:
    the user editing requests are to be generated simultaneously.

9. The one or more non-transitory machine-readable media of claim 8, wherein:
    the remote computer platforms are to store local copies of the one or more documents; and
    the local copies are to be updated based upon the document-related information.

10. The one or more non-transitory machine-readable media of claim 9, wherein:
    the local copies of the one or more documents are for use during the collaborative editing.

11. The one or more non-transitory machine-readable media of claim 10, wherein:
    one or more changes to one or more of the local copies are to be synchronized across all others of the local copies and the one or more documents, as stored, at the one or more servers;
    the one or more document changes, as stored at the one or more servers, are to be pushed to the computer platforms; and/or
    the one or more changes to the one or more of the local copies are capable of occurring offline.

12. One or more servers capable of communicating, when the one or more servers are in operation, via one or more networks, with remote computer platforms, the one or more servers comprising:
    one or more hardware processors;
    storage storing instructions that are capable of being executed by the one or more hardware processors, the instructions when executed by the one or more hardware processors resulting in the one or more servers being capable of performing operations comprising:
        providing document-related information that is to be communicated via the one or more networks, the information being for use by the remote computer platforms, the information being usable to modify one or more documents to reflect online collaborative editing to be carried out using the computer platforms, the information being based upon user editing requests received via the remote computer platforms during the collaborative editing, the one or more documents to be associated with one or more groups of users for permitting the collaborative editing, the one or more documents to be created using one or more software applications to be executed by one or more of the remote computer platforms, the one or more documents to be stored at the one or more servers, the information also to be used to indicate (1) respective document modifications requested by respective users in the one or more groups during the online collaborative editing, and (2) the respective users requesting the respective document modifications; and
        providing user chat message information that is to be communicated via the one or more networks, during the online collaborative editing;
    wherein:
        the one or more servers are capable of associating, based upon user input, the one or more documents with (1) the one or more groups and (2) one or more project names of one or more projects associated with the one or more groups;
        the one or more documents are capable of being tagged with user-selected metadata tag information, to indicate association of the one or more documents with the one or more project names;
        the user-selected metadata tag information is also to enable searching based upon the one or more project names;
        one or more notifications are to be provided to the one or more users to indicate creation of the one or more projects;
        one or more other documents stored by the one or more of the computer platforms are to be automatically identified for sharing among the users of the one or more groups;
        automatic identification of the one or more other documents for the sharing among the users of the one or more groups is to be determined based at least in part upon whether the one or more other documents are stored in one or more locations.

13. The one or more servers of claim 12, wherein:
    the user editing requests are to be generated during the online collaborative editing;
    during the online collaborative editing, the one or more documents are to be modified based upon the document-related information, in or near real-time to reflect the user editing requests;
    the one or more software applications are to be stored at the one or more of the computer platforms; and
    the one or more servers are to receive one or more requests associated with one or more of the users of the one or more groups, the one or more documents to be associated with the one or more groups based upon the one or more requests associated with the one or more of the users of the one or more groups.

14. The one or more servers of claim 13, wherein:
one or more subsets of the users of the one or more groups are to be restricted from modifying the one or more documents;
the document-related information comprises tracking-related information to track:
one or more times and one or more dates of one or more document changes;
one or more other notifications are to be provided to indicate the one or more document changes;
the one or more software applications comprise:
a spreadsheet application;
a word processing application; and/or
a presentation application; and
the one or more documents comprise a word processing document, a spreadsheet document, and/or a presentation document.

15. The one or more servers of claim 14, wherein:
the metadata tag information is also to enable search for content similarities;
the one or more documents are to be encrypted;
the user editing requests are to be generated simultaneously;
the remote computer platforms are to store local copies of the one or more documents;
the local copies are to be updated based upon the document-related information; and
the local copies of the one or more documents are for use during the collaborative editing.

16. The one or more servers of claim 15, wherein:
one or more changes to one or more of the local copies are to be synchronized across all others of the local copies and the one or more documents, as stored, at the one or more servers;
the one or more document changes, as stored at the one or more servers, are to be pushed to the computer platforms; and/or
the one or more changes to the one or more of the local copies are capable of occurring offline.

17. A method implemented using one or more servers, the one or more servers being capable of communicating via one or more networks with remote computer platforms, the method comprising:
providing, by the one or more servers, document-related information that is to be communicated via the one or more networks, the information being for use by the remote computer platforms, the information being usable to modify one or more documents to reflect online collaborative editing to be carried out using the computer platforms, the information being based upon user editing requests received via the remote computer platforms during the collaborative editing, the one or more documents to be associated with one or more groups of users for permitting the collaborative editing, the one or more documents to be created using one or more software applications to be executed by one or more of the remote computer platforms, the one or more documents to be stored at the one or more servers, the information also to be used to indicate (1) respective document modifications requested by respective users in the one or more groups during the online collaborative editing, and (2) the respective users requesting the respective document modifications; and providing, by the one or more servers, user chat message information that is to be communicated via the one or more networks, during the online collaborative editing;
wherein:
the one or more servers are capable of associating, based upon user input, the one or more documents with (1) the one or more groups and (2) one or more project names of one or more projects associated with the one or more groups;
the one or more documents are capable of being tagged with user-selected metadata tag information, to indicate association of the one or more documents with the one or more project names;
the user-selected metadata tag information is also to enable searching based upon the one or more project names;
one or more notifications are to be provided to the one or more users to indicate creation of the one or more projects;
one or more other documents stored by the one or more of the computer platforms are to be automatically identified for sharing among the users of the one or more groups;
automatic identification of the one or more other documents for the sharing among the users of the one or more groups is to be determined based at least in part upon whether the one or more other documents are stored in one or more locations.

18. The method of claim 17, wherein:
the user editing requests are to be generated during the online collaborative editing;
during the online collaborative editing, the one or more documents are to be modified based upon the document-related information, in or near real-time to reflect the user editing requests;
the one or more software applications are to be stored at the one or more of the computer platforms;
the one or more servers are to receive one or more requests associated with one or more of the users of the one or more groups, the one or more documents to be associated with the one or more groups based upon the one or more requests associated with the one or more of the users of the one or more groups;
one or more subsets of the users of the one or more groups are to be restricted from modifying the one or more documents;
the document-related information comprises tracking-related information to track:
one or more times and one or more dates of one or more document changes;
one or more other notifications are to be provided to indicate the one or more document changes;
the one or more software applications comprise:
a spreadsheet application;
a word processing application; and/or
a presentation application; and
the one or more documents comprise a word processing document, a spreadsheet document, and/or a presentation document.

19. The method of claim 18, wherein:
the metadata tag information is also to enable search for content similarities;
the one or more documents are to be encrypted;
the user editing requests are to be generated simultaneously;
the remote computer platforms are to store local copies of the one or more documents;

the local copies are to be updated based upon the document-related information; and the local copies of the one or more documents are for use during the collaborative editing.

20. The method of claim 19, wherein:

one or more changes to one or more of the local copies are to be synchronized across all others of the local copies and the one or more documents, as stored, at the one or more servers;

the one or more document changes, as stored at the one or more servers, are to be pushed to the computer platforms; and/or the one or more changes to the one or more of the local copies are capable of occurring offline.

21. One or more servers capable of communicating, when the one or more servers are in operation, via one or more networks, with remote computer platforms, the one or more servers comprising:

means for providing document-related information that is to be communicated via the one or more networks, the information being for use by the remote computer platforms, the information being usable to modify one or more documents to reflect online collaborative editing to be carried out using the computer platforms, the information being based upon user editing requests received via the remote computer platforms during the collaborative editing, the one or more documents to be associated with one or more groups of users for permitting the collaborative editing, the one or more documents to be created using one or more software applications to be executed by one or more of the remote computer platforms, the one or more documents to be stored at the one or more servers, the information also to be used to indicate (1) respective document modifications requested by respective users in the one or more groups during the online collaborative editing, and (2) the respective users requesting the respective document modifications; and means for providing user chat message information that is to be communicated via the one or more networks, during the online collaborative editing;

wherein:

the one or more servers are capable of associating, based upon user input, the one or more documents with (1) the one or more groups and (2) one or more project names of one or more projects associated with the one or more groups;

the one or more documents are capable of being tagged with user-selected metadata tag information, to indicate association of the one or more documents with the one or more project names;

the user-selected metadata tag information is also to enable searching based upon the one or more project names;

one or more notifications are to be provided to the one or more users to indicate creation of the one or more projects;

one or more other documents stored by the one or more of the computer platforms are to be automatically identified for sharing among the users of the one or more groups;

automatic identification of the one or more other documents for the sharing among the users of the one or more groups is to be determined based at least in part upon whether the one or more other documents are stored in one or more locations.

22. The one or more servers of claim 21, wherein:

the user editing requests are to be generated during the online collaborative editing;

during the online collaborative editing, the one or more documents are to be modified based upon the document-related information, in or near real-time to reflect the user editing requests;

the one or more software applications are to be stored at the one or more of the computer platforms; and the one or more servers are to receive one or more requests associated with one or more of the users of the one or more groups, the one or more documents to be associated with the one or more groups based upon the one or more requests associated with the one or more of the users of the one or more groups.

23. The one or more servers of claim 22, wherein:

one or more subsets of the users of the one or more groups are to be restricted from modifying the one or more documents;

the document-related information comprises tracking-related information to track:

one or more times and one or more dates of one or more document changes;

one or more other notifications are to be provided to indicate the one or more document changes;

the one or more software applications comprise:
a spreadsheet application;
a word processing application; and/or
a presentation application; and the one or more documents comprise a word processing document, a spreadsheet document, and/or a presentation document.

24. The one or more servers of claim 23, wherein:

the metadata tag information is also to enable search for content similarities;

the one or more documents are to be encrypted;

the user editing requests are to be generated simultaneously;

the remote computer platforms are to store local copies of the one or more documents;

the local copies are to be updated based upon the document-related information; and the local copies of the one or more documents are for use during the collaborative editing.

25. The one or more servers of claim 24, wherein:

one or more changes to one or more of the local copies are to be synchronized across all others of the local copies and the one or more documents, as stored, at the one or more servers;

the one or more document changes, as stored at the one or more servers, are to be pushed to the computer platforms; and/or the one or more changes to the one or more of the local copies are capable of occurring offline.

* * * * *